UNITED STATES PATENT OFFICE.

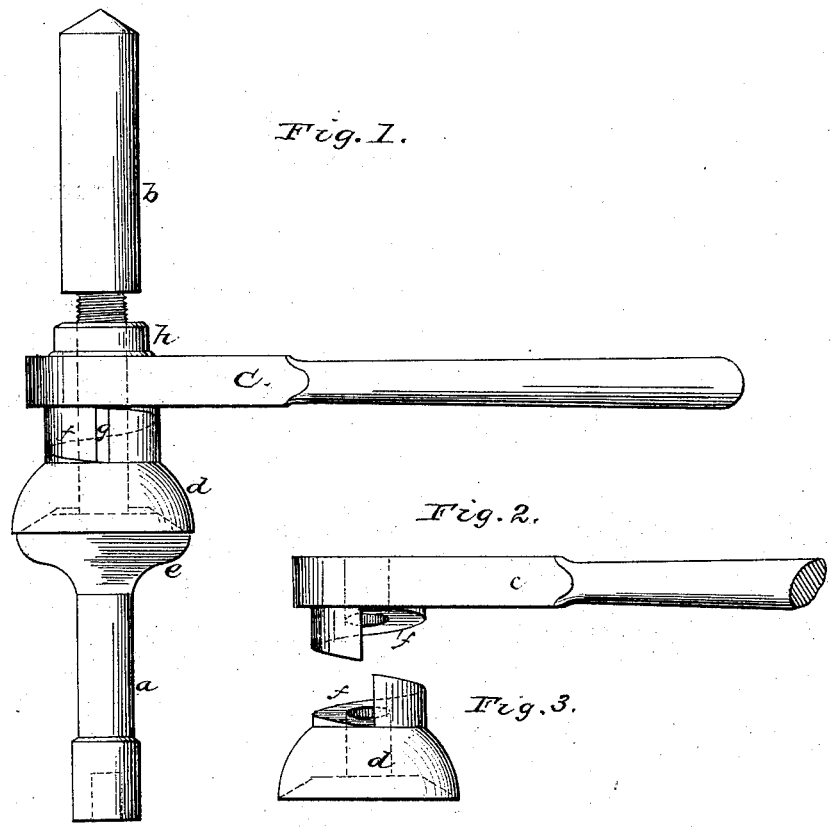

SIMON INGERSOLL, OF STAMFORD, CONNECTICUT.

IMPROVEMENT IN CLUTCHES.

Specification forming part of Letters Patent No. 38,486, dated May 12, 1863.

*To all whom it may concern:*

Be it known that I, SIMON INGERSOLL, of Stamford, in the county of Fairfield and State of Connecticut, have invented a new and Improved Friction-Clutch; and I do hereby declare that the following is a full, clear, and exact description of the construction and operation of the same, reference being had to the annexed drawings, making a part of this specification.

The nature of my invention consists in using two friction-disks, either flat or concave and convex, combined with two reversed inclined planes, one of which disks is fixed on the shaft stationary and moves with it. The other is attached to one of the inclined planes. The other inclined plane is attached to the handle or lever by which the shaft is worked.

I will now proceed to describe my machine, its construction, and operation in order that others skilled in the art may make and use the same either for a drill, as shown in the drawing, or as a clutch, or as a saw-mill or sewing-machine feed, or any other friction apparatus where power and durability are required.

I construct the shaft of my drill or clutch $a$ in the ordinary way of holding the drill, and also of forcing or keeping it up to the work to be done, by the use of the screw and socket $b$; but in moving the drill forward I use the two disks $d\ e$, $e$ being fixed on the shaft $a$, $d$ being movable and subject to the action of handle $c$ and inclined plane $f$. There may be a spring between the ends of the inclined planes $f\ f$ at $g$, so that they are kept snug together when the handle or lever $c$ is drawn back with its inclined plane $f$, so there will be no lost time as the drill is driven forward, thereby preventing the noise usually caused by the pawl and ratchet of an ordinary drill, and also preventing the loss of motion usually caused by the pawl passing the teeth of the ratch-wheel by which it is driven against which it is brought up suddenly by the forward movement of the lever $c$.

$h$ is the nut by which the inclined planes $ff$ and the disks $d\ e$ are kept up snug together, and by which the wear of the inclined planes and the disks $d\ e$ is restored by screwing down nut $h$ at any time. It can be used for a drill, as shown in the drawing, or it can be used as a clutch for connecting shafting, or for a saw-mill or sewing-machine feed, or in any place where a shaft is to be rotated by a reciprocating movement.

Operation: By placing the hand on lever $c$ and pushing it forward the inclined planes $ff$ and disks $d\ e$ are all brought in contact with nut $h$ by the inclined planes $ff$ passing each other, thereby expanding or elongating inclined planes $f\ f$ and disk $d$, by which means the disk $d$ and inclined plane $f$, which is fast to handle $c$, are pressed against nut $h$ and fixed disk $e$, thereby causing friction between disk $e$ and nut $h$, by which means the shaft is driven forward; then by pushing back the handle $c$ the inclined planes react and liberate the disks $d\ e$, and as the plane that is fast to handle $c$ comes against the plane and disk $df$ and spring $g$ they all react together, while the disk $e$ and shaft $a$ and nut $h$ remain fixed until the handle $c$ is again pressed forward.

Therefore, I claim as new—

The combination of the following parts, to wit: the inclined planes $ff$, disk $d$, stationary disk $e$, and nut $h$, or its equivalent, all arranged and operating together as a friction-clutch in the manner specified.

SIMON INGERSOLL.

Witnesses:
SETH MILLER,
WM. H. HOLLY.